United States Patent
Hirahara

[15] 3,698,201
[45] Oct. 17, 1972

[54] FREEZE MOLDING SLICE MATERIAL
[72] Inventor: Katsuji Hirahara, 781 Teresi Court, San Jose, Calif. 95117
[22] Filed: April 2, 1971
[21] Appl. No.: 130,723

Related U.S. Application Data

[62] Division of Ser. No. 821,210, May 2, 1969, Pat. No. 3,604,319.

[52] U.S. Cl. ................62/62, 62/380, 99/194, 99/198
[51] Int. Cl. ................F25d 25/00
[58] Field of Search ........99/192, 194, 198; 62/1, 60, 62/62, 380, 374, 375

[56] References Cited

UNITED STATES PATENTS

| | | |
|---|---|---|
| 1,998,431 | 4/1935 | Birdseye ................62/380 X |
| 3,091,194 | 5/1963 | Dickinson ................62/1 X |
| 3,616,543 | 11/1971 | Barclay ................62/60 X |

*Primary Examiner*—Meyer Perlin
*Assistant Examiner*—Ronald C. Capossela
*Attorney*—F. W. Anderson

[57] ABSTRACT

Slice material (e.g., turkey slices) is loaded onto a loading tray backed up by a stripper bar. Both of these elements are projected into an empty horizontal mold, first the tray is retracted and then the stripper bar, leaving the slice material in the mold. The mold is then brought to a vertical position, filled with liquid (e.g., gravy) and the product aggregate is immersion frozen in the mold.

1 Claim, 15 Drawing Figures

FREEZE MOLDING SLICE MATERIAL

This is a division of application, Ser. No. 821,210, filed May 2, 1969 now U.S. Pat. No. 3,604,319.

BACKGROUND OF THE INVENTION

Field of Invention

This invention relates to freeze molding and more particularly to freeze molding of slice materials such as turkey slices or the like in conjunction with a liquid such as gravy.

SUMMARY OF THE INVENTION

This invention will be described in conjunction with the formation of a frozen slab of turkey slices in gravy which may form part of a TV dinner although it is understood that this utilization of the invention is merely exemplary. Reference will be made to "slice material" it being understood that this term is intended to apply to solids in this or "slice" form, because the slices need not be formed by a cutting or slicing operation, they need only be relatively flat and thin.

In accordance with the present invention advantage is taken of the thin, flat nature of the freezing molds of apparatus such as that shown in United States Patent to Hirahara et al., U.S. Pat. No. 3,403,639, issued Oct. 1, 1968, assigned to the FMC Corporation. Under the present invention, the thin, flat nature of slice materials (such as turkey slices or the like) is utilized in the loading of the mold and the subsequent handling thereof to provide optimum heat transfer during freezing, thereby insuring a completely frozen product, even though that product is frozen in the presence of gravy or the like which is a relatively poor heat conductor.

In practicing the present invention, the slice material is loaded on a tray that is backed up by a stripper bar. Both tray and stripper bar are advanced into a mold, when the latter is horizontally disposed on a vertical run at the filler end of the freeze mold machine. The tray is withdrawn first, but the stripper bar holds the slice material in the mod and then the stripper bar is withdrawn. The mold is then tilted to the vertical for filling with gravy and is next immersed in the freezing tank of the machine. The slice material and gravy are frozen into a slab and the frozen product removed from the mold. With this method of filling and handling of the mold, the slice material remains parallel to the flat side walls of the mold, even when they are tilted to the vertical position. This optimizes the flow of heat from the slice material to the freezing solution and provides the advantages heretofore referred to.

DETAILED DESCRIPTION

General Arrangement

Figures 1, 2A:
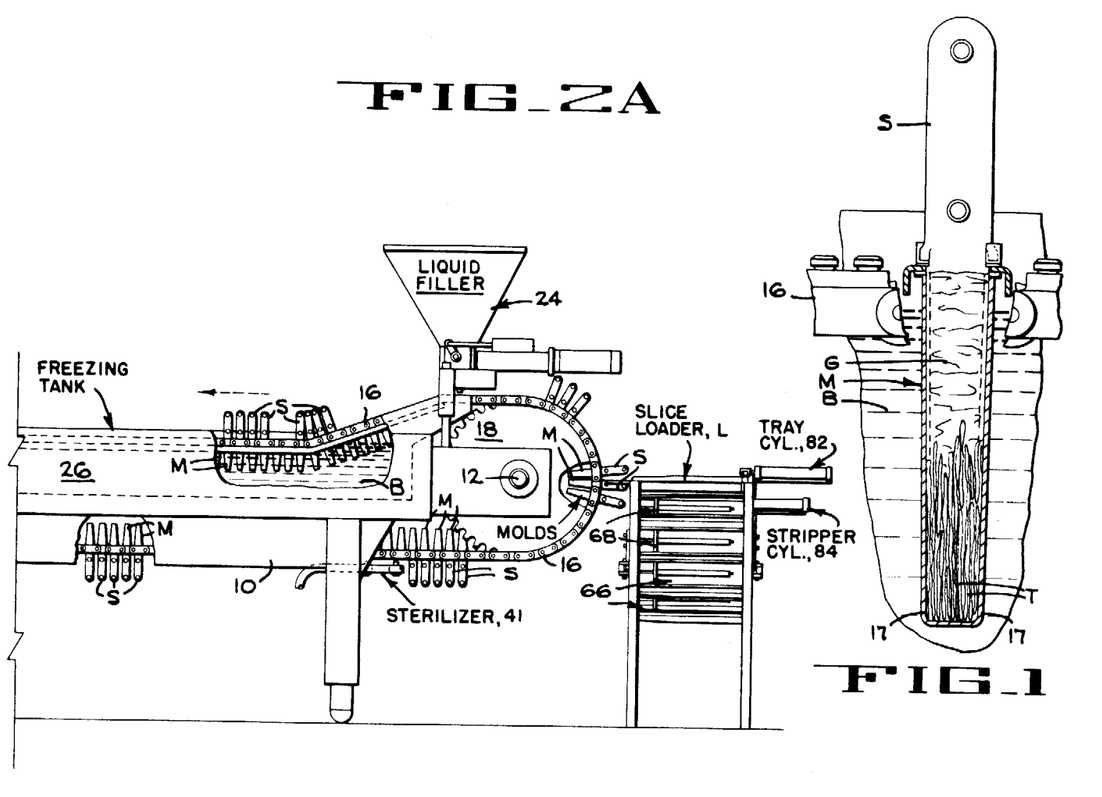
FIG. 1 is an enlarged section through a filled mold immersed in a freezing solution.
FIGS. 2A and 2B are companion diagrams of a freeze molding machine embodying the invention.

FIG. 1 is an enlarged section through a mold immersed in a freezing solution, illustrating the orientation of the products during freezing. In this figure a flat-sided mold M (see FIG. 3) is shown which is divided along its width or lateral dimension with divider strips S for dividing the mold into individual sections. The mold is shown immersed in a cold brine solution B for freezing the product. In the product illustrated in FIG. 1, the slice material is shown in the form of slices T (which may be turkey meat or the like) and the balance of the mold has been filled with a liquid, (e.g., gravy G). When this aggregate is frozen into blocks or slabs they can be packaged as elements of a TV dinner, it being understood that use of the invention is not directed to the production of any particular product. Consideration will show that the parallel orientation of the slices T with the side walls of the mold M facilitate heat transfer of the material to the brine B to insure complete and uniform freezing of the slice material, even though it is surrounded by a relatively poor conductor in the form of the gravy G.

Figure 2B:
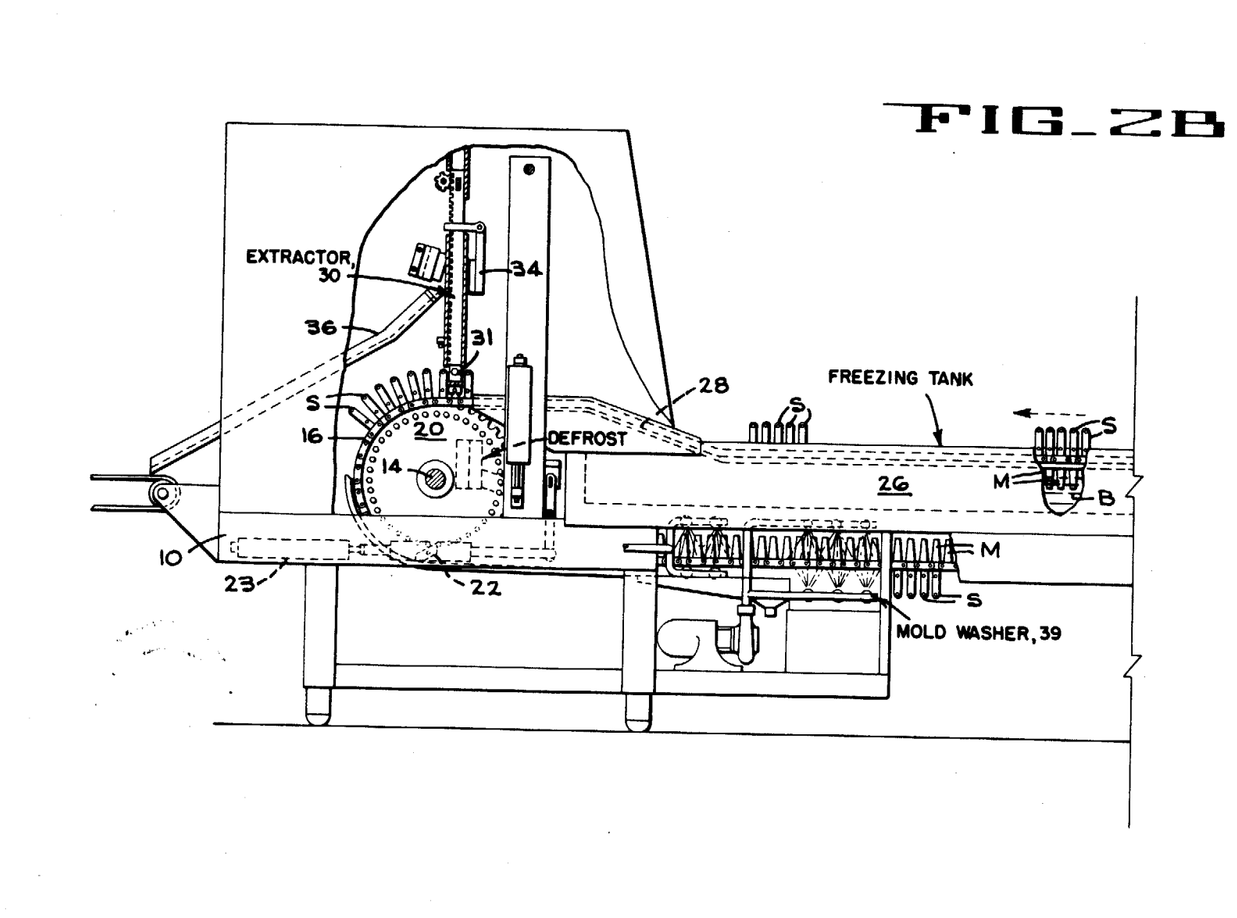

FIGS. 2A and 2B taken together illustrate a freeze molding machine suitable for utilization of the present invention. The machine illustrated is basically like that of the aforesaid United States patent to Hirahara et al. U.S. Pat. No. 3,403,639, incorporated herein by reference. The basic elements of the machine will be referred to briefly, it being understood that the details of these elements are not critical to the practice of the present invention. Referring to FIGS. 2A and 2B, a slice loader L is disposed at the filler end of a freeze molding machine that includes liquid filler and a freezing tank. The machine frame 10 mounts end conveyor sprocket shafts 12 and 14. Flat, elongated molds M are supported at each end on laterally spaced conveyor chains 16 trained around sprockets 18, 20 mounted on the sprocket shafts 12 and 14, respectively. Except for a brief interval during the slab handling cycle, each of the molds M contains two divider strips S, that span the mold side walls 17 and thus compartmentalize the molds into three sections. The conveyor chains 16 and attached mold assemblies M are indexed by a reciprocating mechanism pawl and ratchet mechanism 22, (FIG. 2B), which indexes sprockets 20 to bring the molds one at a time to the various stations of the apparatus.

Thus, the molds are individually stopped beneath a mold filler 24 and advanced intermittently through a freezing tank 26 which contains the brine B at a subfreezing temperature such as minus 30° F. Here the slice material T and the gravy G are frozen into slab blocks interrupted by the divider strips S adhered to the blocks. The molds M and frozen slabs leave the brine tank along an ascending reach 28 of the chain conveyor to a slab extractor 30. (FIG. 2B).

At the slab extractor, the molds containing the frozen slabs of material are externally thawed to release the slabs from the molds. As the molds are indexed to the extractor 30, projecting upper portions of the divider strips S are revevied in carriers 31, and the slabs are raised from their molds and brought to a breaker mechanism 34. The slab breaker is carrier-activated to rap the composite slab and break it into individual blocks of frozen product material. The blocks slide down a delivery chute 36 underlying the breaker mechanism.

The extractor mechanism 30 next lowers each row of free divider strips S and reinserts them simultaneously into the molds M. Once reinserted, the conveyor index mechanism 22 removes the recently emptied mold from beneath the extractor and introduces a new filled mold thereunder. As the emptied molds leave the carrier, they are successively advanced to a mold washer 39 and to a sterilizer 41. The sterilized molds and their divider strips are next indexed to the slice loader L (FIG. 2A) and are returned to the mold filler 24 and recycled through the apparatus.

In employing the apparatus of the present invention, the slice loader L is disposed at a substantially vertical run of the molds for loading them with slice material T when they are generally horizontally disposed. This loading takes place at the inlet sprocket 18 of the freeze molding apparatus. The slice loader L inserts the slice material such as the turkey slices T (FIG. 1) against the bottom walls of the molds, with the slices parallel to the mold side walls, and the slice material remains in this parallel orientation when the molds are tilted into the vertical position for filling with the gravy G at the liquid filler 24, and during the subsequent freezing, as previously described.

The Slice Loader

Figure 3:
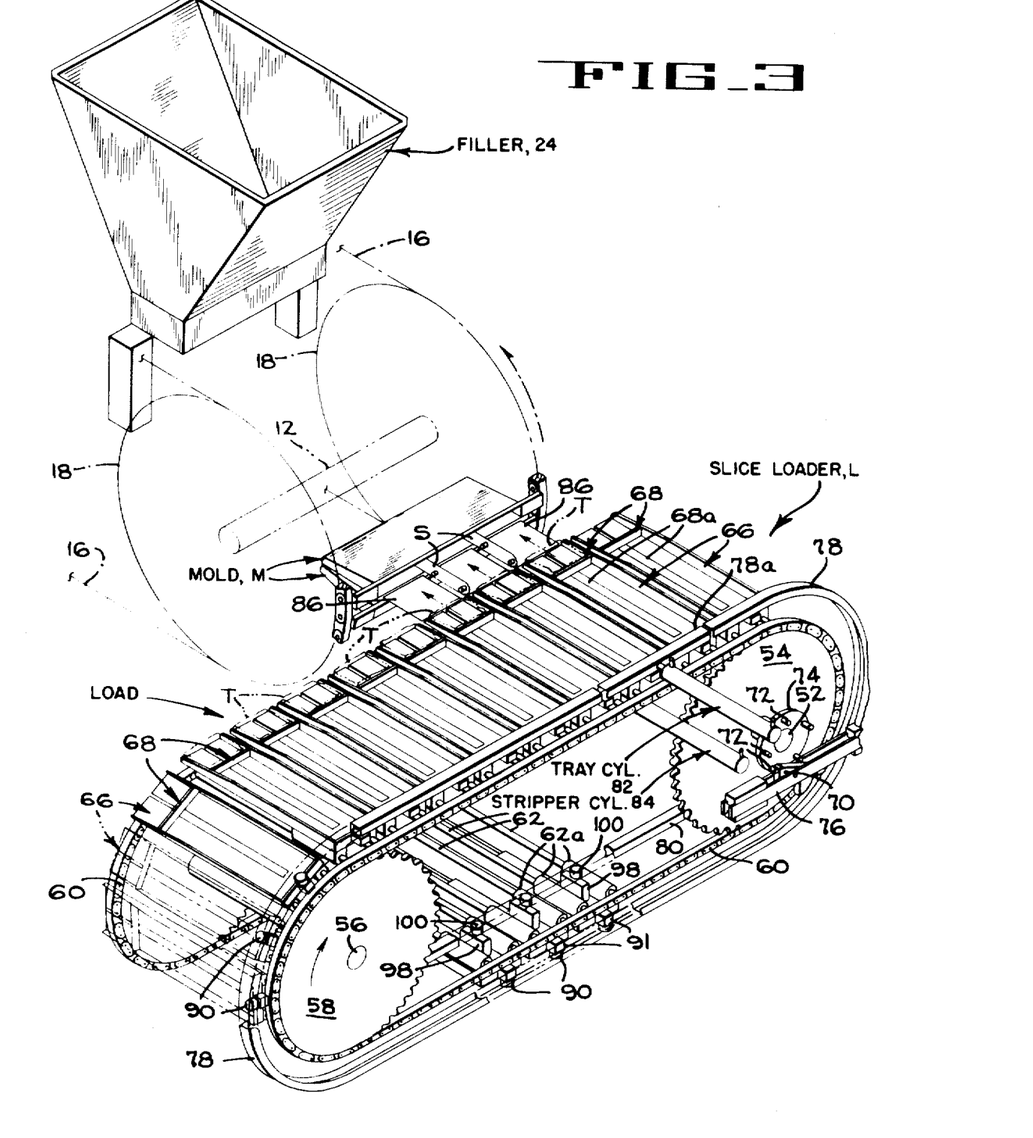
FIG. 3 is a perspective of a slice loader for carrying out the invention.
Figure 4:
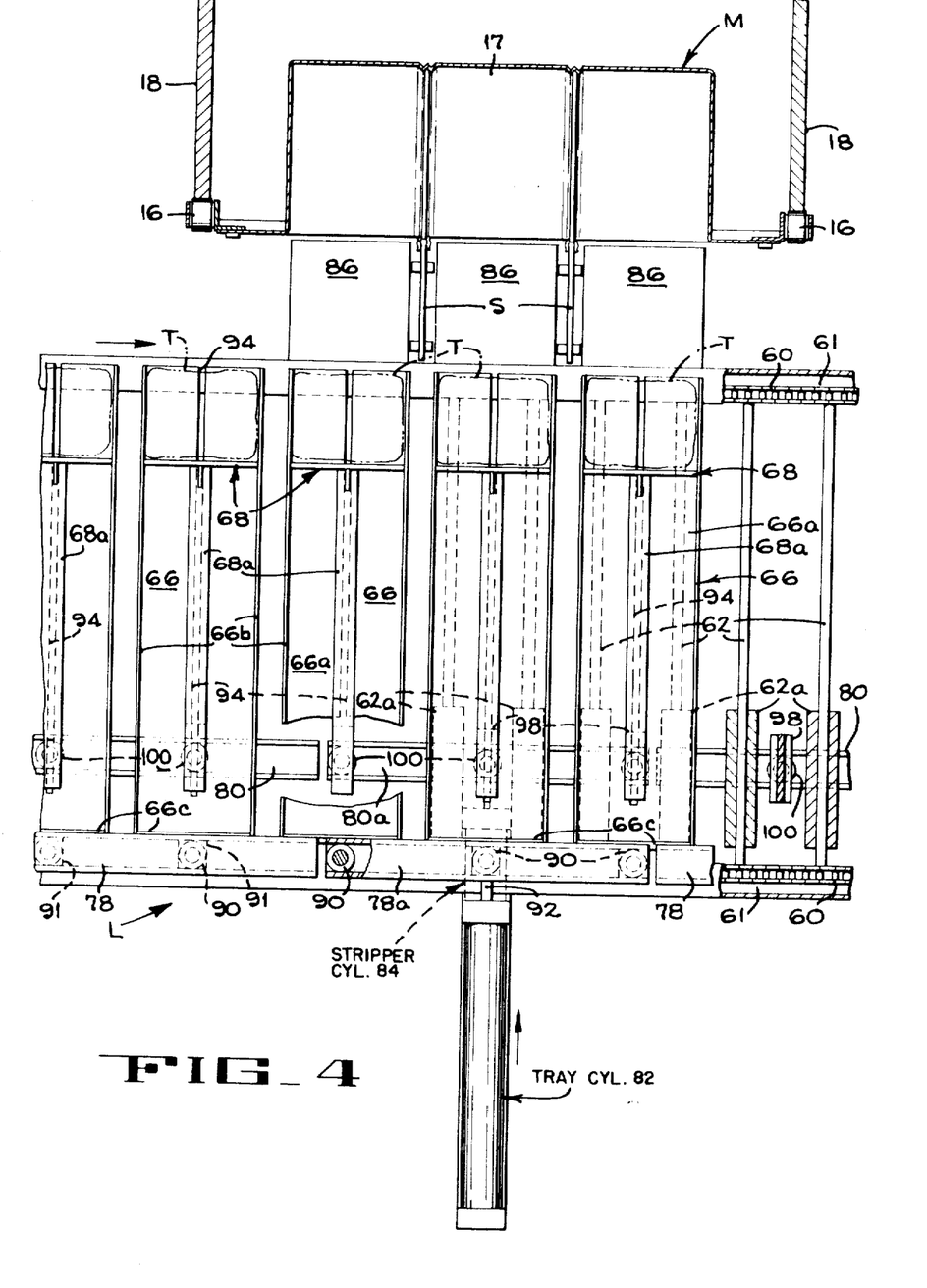
FIG. 4 is a fragmentary plan of the slice loader.
Figure 6:
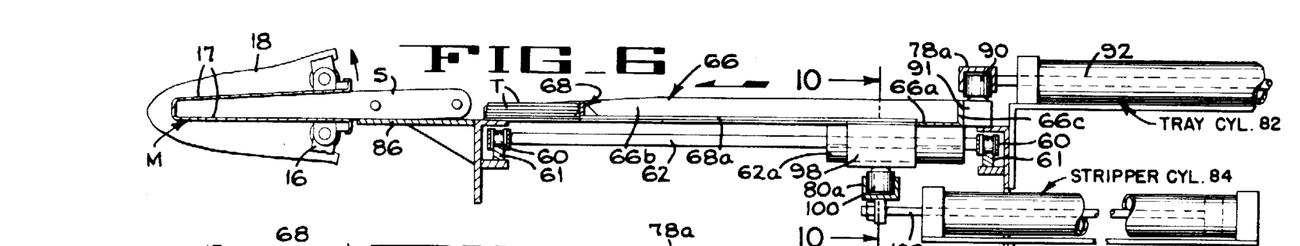
FIGS. 6 – 9 are operational diagrams.
Figures 10, 12:
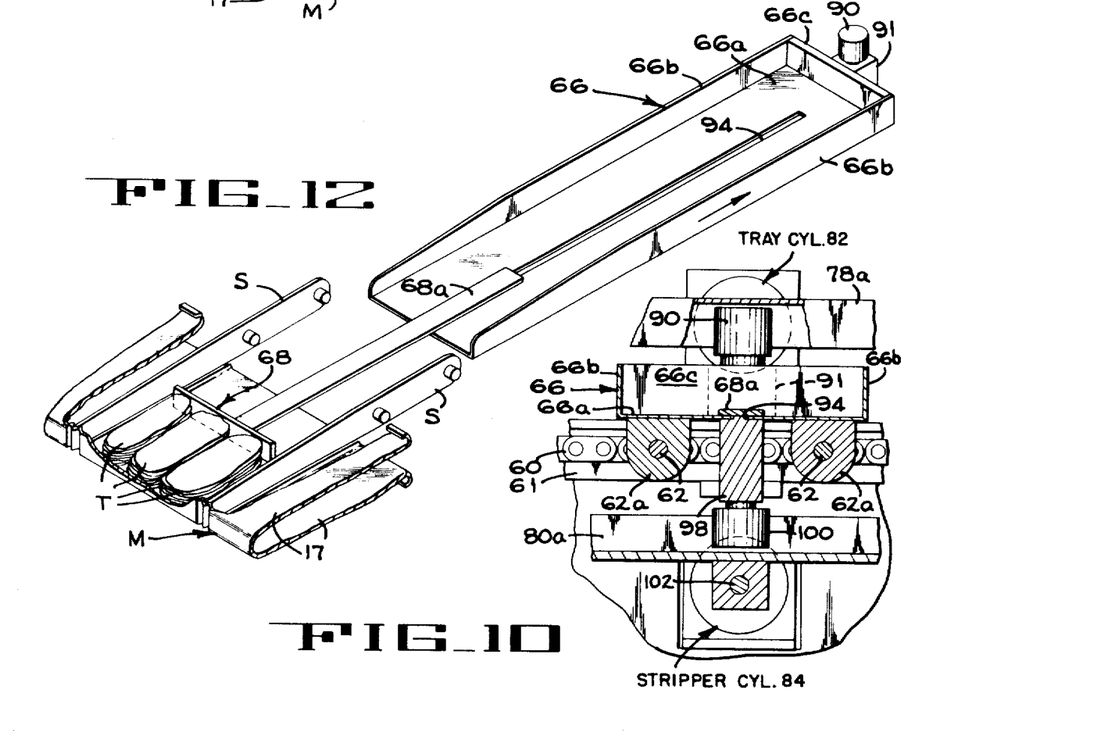
FIG. 10 is the section taken on line 10 — 10 of FIG. 6.
FIG. 12 is a perspective view similar to FIG. 11 but showing the slice material stripped from the tray and deposited in the mold.
Figure 11:
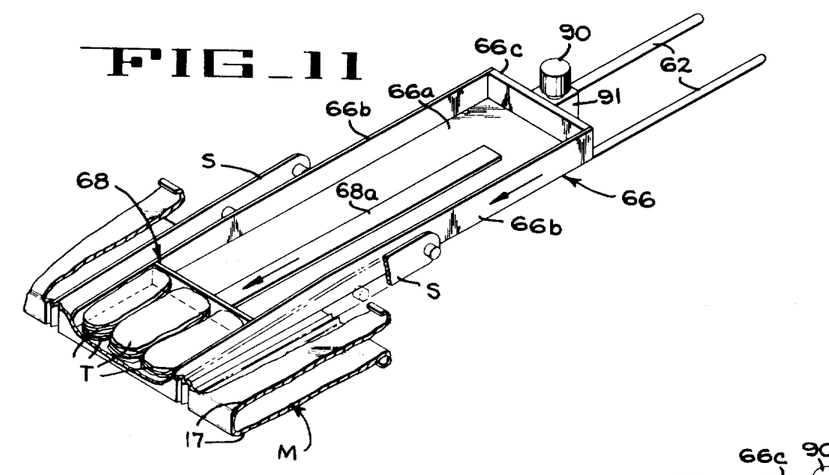
FIG. 11 is a perspective view of the tray with sliced material deposited thereon, said tray being projected into a mold.

The major elements of the slice loader L will now be described. Referring to FIG. 3, a driving shaft 52 mounts spaced driving sprockets 54, only one of which appears in the figure. At the tray loading end of the machine, an idler shaft 56 carries spaced idler sprockets 58. Chains 60 are trained around these sprockets to form an endless conveyor, and the upper reaches of the chains rest on guard rails 61 (FIG. 6). The chains are connected by laterally extending cross bars 62 which also serve as guides for loading tray assemblies, as will be described presently. The cross bars 62 are best seen in FIGS. 4, 6 and 10.

Figure 5:
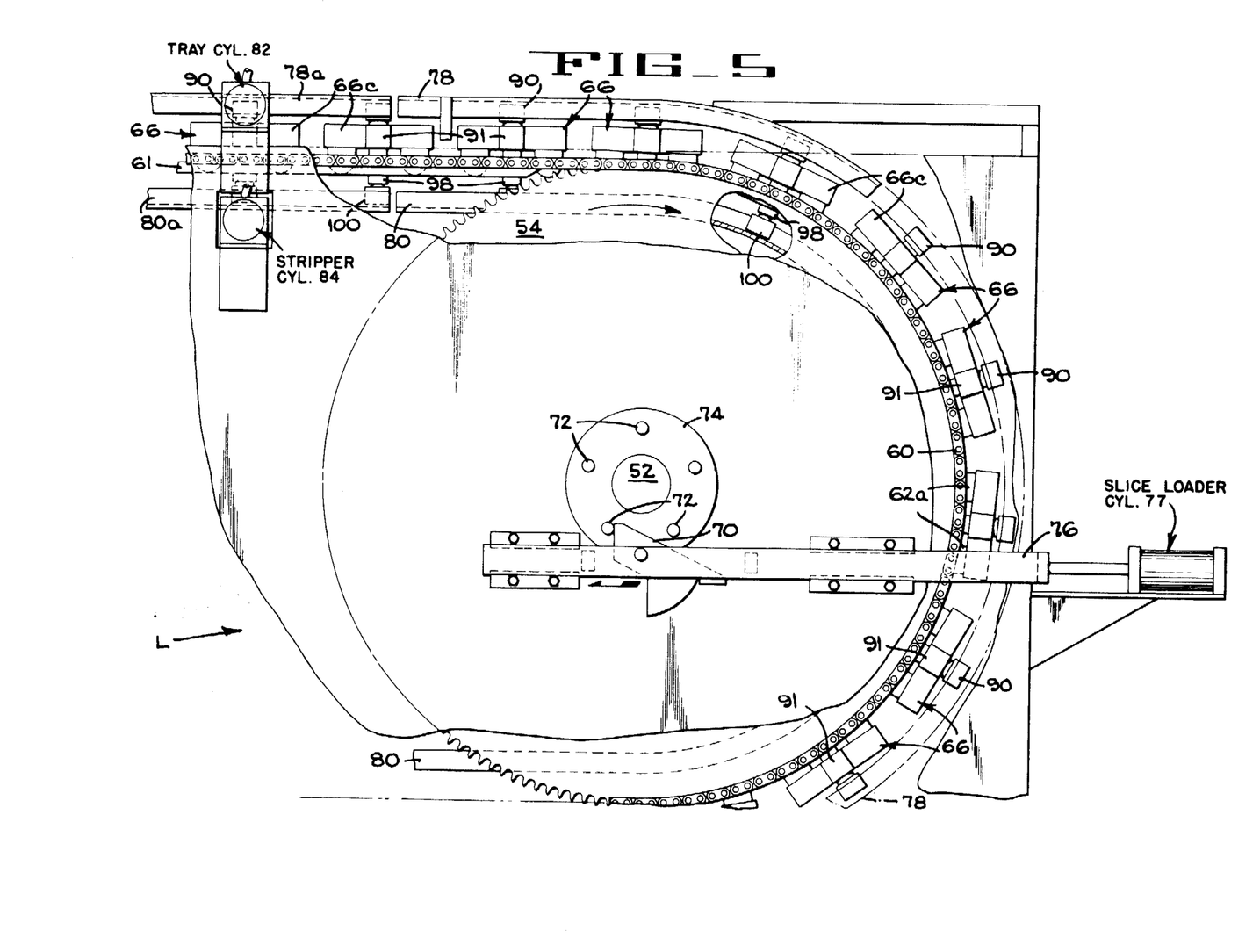
FIG. 5 is an enlarged side view of one end of the slide loader.

The cross bars 62 slidably support an endless row of loading trays 66 and each loading tray has sliding along the outer face thereof a stripper bar 68. The slice loader conveyor is advanced intermittently and is indexed by a distance corresponding to the longitudinal extent of three loading trays, in the illustrated example. The details of the indexing mechanism for the conveyor are not critical to the present invention. The indexing mechanism shown appears in FIGS. 3, 5 and 14 and comprises laterally spaced but connected reciprocating pawls 70 that engage pins 72 on indexing disc 74 keyed to the sprocket drive shaft 52. This mechanism in like the indexing mechanism 22 for the freeze molding machine, described in detail in the Hirahara et al. patent. The pawls are mounted on a yoke 76 (FIG. 14) which is reciprocated by a slice loader cylinder 77. Thus, as the slice loader cylinder is reciprocated by the timing mechanism shown in FIG. 14, trays are advanced (three at a time) into a mold of the freeze molding machine. The trays 66 will have been loaded with slice material, such as turkey slices T, at a "load" position upstream of the freeze molding apparatus, as indicated in FIG. 3.

At all points around the slice loader except the position wherein the slice material being loaded into the molds, the loading trays 66 are held in their retracted position by inverted channel guides 78 and the stripper bars 68 are held in their retracted position by internal, outwardly facing channel guides 80. (See FIGS. 3 – 5 and 10). Both channels are interrupted throughout a span of three trays directly in front of the freeze molding machine by means of laterally reciprocating track sections. The channel 78 for the trays is interrupted by an operating track section 78a, and the stripper bar guide channel 80 is interrupted at the same location by an operating channel track section 80a. The tray channel section 78a is reciprocated for loading and withdrawal of the trays by a tray cylinder 82. The stripper bars are advanced and retracted independently of the trays by a stripper cylinder 84 (FIGS. 3 and 6 – 10). Bridge plate 86 (FIGS. 3 – 6) are mounted between the slice loader L and the molds M to assist in supporting the tray and stripper as they are extended and retracted.

Tray Construction

The loading tray 66 is constructed and mounted as follows: the tray has a bottom wall 66a, side walls 66b and a rear wall 66c (FIGS. 6 and 10). Guide blocks 62a project downwardly from the loading tray bottom wall 66a and these blocks are apertured to slide along the cross bars 62 that span the chains 60, as previously described.

In order to advance and retract the loading tray 66, a roller 90 projects upwardly from a block 91 secured to the rear tray wall 66c. The roller 90 rides within the channel track 78 as well as entering the operating track section 78a. As mentioned, the track section 78a for the loading tray is operated by the tray cylinder 82. In the embodiment illustrated, the track section 78a is connected directly to the piston rod 92 of that cylinder. Thus, when the tray cylinder 82 is actuated to advance the piston rod 92, the track section 78a advances the rollers 90 of three trays 66, to insert the slice material T into a mold M. When the tray cylinder 82 is actuated in the opposite direction, the three trays 66 are retracted from the mold.

The tray stripper bars 68 can move independently of the trays. Each bar 68 is connected to the forward end of a slider 68a which rides over the bottom wall 66a of the associated loading tray. As best seen in FIG. 12, the bottom wall 66a of each loading tray is slotted at 94 to receive a slide block 98 (FIGS. 6 and 10) that is necked down to project up through the tray slot 94 and is fastened to the slide bar 68a for the stripper. A roller 100 projects down from each slide block 98 and these rollers ride in the track 80 as well as in the operating track section 80a at the freeze molding machine. The operating track section 80a for the stripper bars 68 is connected to the piston rod 102 of the stripper cylinder 84 for advance and retract motion that takes place during the loading operation.

Operation

The operation of the tray and stripper assembly will now be described. Slice material, such as turkey slices T, will have been applied at the "LOAD" zone upstream of the freeze molding machine, indicated in FIG. 3. Both the loading trays and their stripper bars will be retracted as they enter the operating track sections 78a and 80a disposed opposite the molds M. The chains 16 in the freeze molding machine are indexed to advance by one mold width and are then stopped for mold filling and frozen product extraction as previously described. The chains 60 of the slice loader L are indexed simultaneously with the indexing of the freeze molding machine chains, but the slice loader chains 60 are indexed by the slide loader cylinder 77 (FIG. 14) by a distance corresponding to the width of three tray assemblies. During the dwell period of both conveyor chains 16 and 60, the loading of slice material onto the trays at the load station (FIG. 3) described above, as well as the advance and retraction of the three loading trays and their associated stripper bars occur.

FIGS. 6 – 9 are operational sections taken at the molds.

FIG. 6 shows both the loading tray 66 and its stripper bar 68 in their fully retracted position, ready to advance slice material T into a mold M. The rollers 90 of three loading trays are in the operating track section 78a, and the rollers 100 of the stripper bars are in the track section 80a, with both track sections retracted and aligned with the main tracks 78 and 80.

Figure 7:
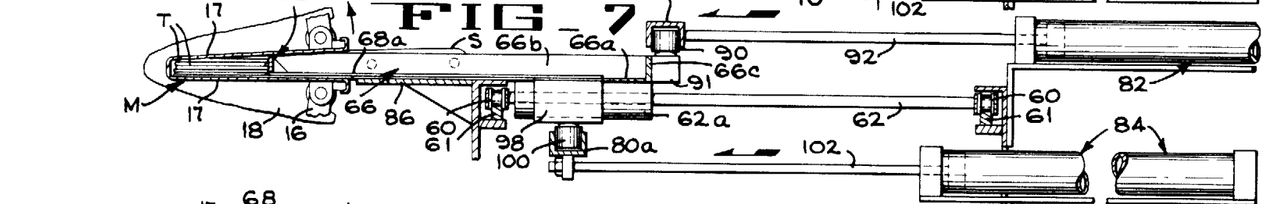

In FIG. 7, both the tray cylinder 82 and the stripper cylinder 84 have been actuated to advance their piston rods 92, 102 respectively. This advances the three loading trays and their stripper bars into the mold M, thereby placing the slice material T in the bottom portion of the molds with the slices parallel to the side walls 17 of the mold as previously described.

Figure 8:
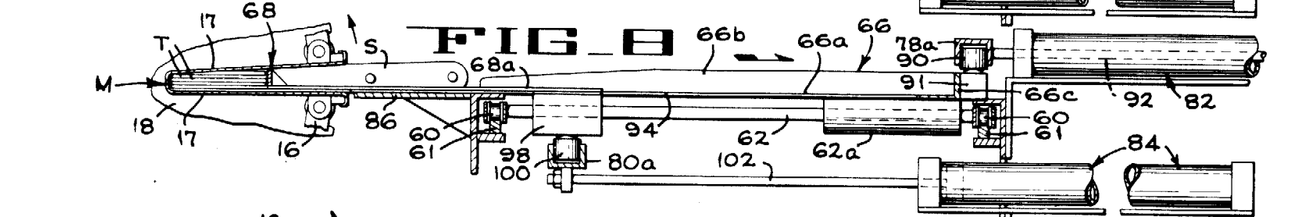

FIG. 8 shows the next portion of the loading cycle, wherein the tray cylinder 82 has been actuated to retract the three loading trays 66. During retraction of the loading trays, the three stripper bars 68 are held in their advanced position by the stripper cylinder 84, thereby maintaining the slice material T in its loaded position within the mold M.

Figure 9:
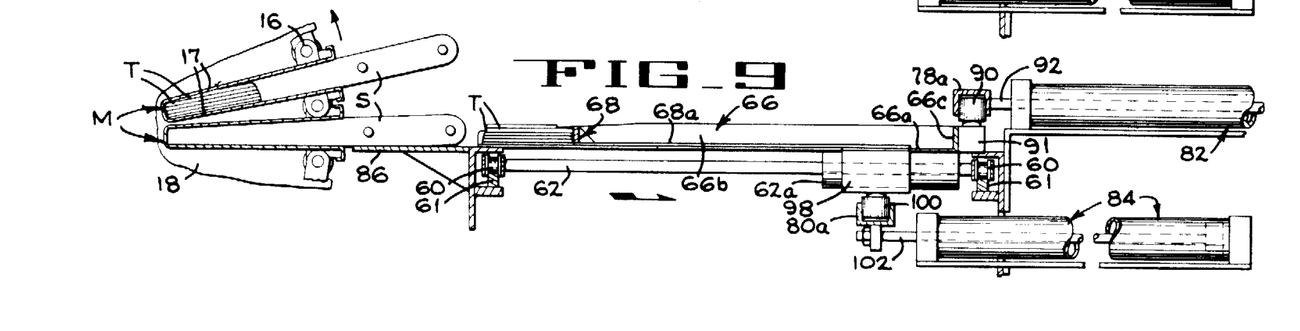

FIG. 9 shows completion of the last step in the loading cycle wherein the tray cylinder 82 holds the three emptied loading trays 66 in their retracted position while the stripper cylinder 84 is actuated to withdraw the three stripper bars from the mold. The slice loader (and the freeze molding machine) conveyors can now be indexed to bring a new group of three loading trays in front of an empty mold. In fact, an empty mold is shown positioned in front of the loading trays in FIG. 9, and the slice loader trays can be considered to be in the process of indexing in this figure.

Figure 13:
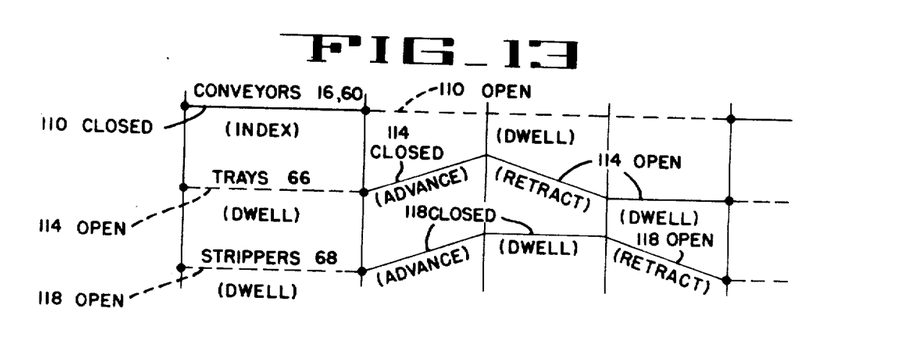
FIG. 13 illustrates the various cycles.

The diagram of FIG. 13 illustrates the various cycles just described. It will be noticed that both conveyors, that is the freeze molding conveyor chains 16 and the slice loader conveyor chains 60 index while the three loading trays 66 and their stripper bars 68 dwell. FIG. 13 also indicates that the conveyor chains 16, 60 of the two conveyors dwell while the three trays 66 advance, retract and dwell for a short period. The figure also illustrates how the three stripper bars 68 advance with the trays, dwell while the trays retract, and retract while the trays dwell in their retracted position.

Control System

Figure 14:
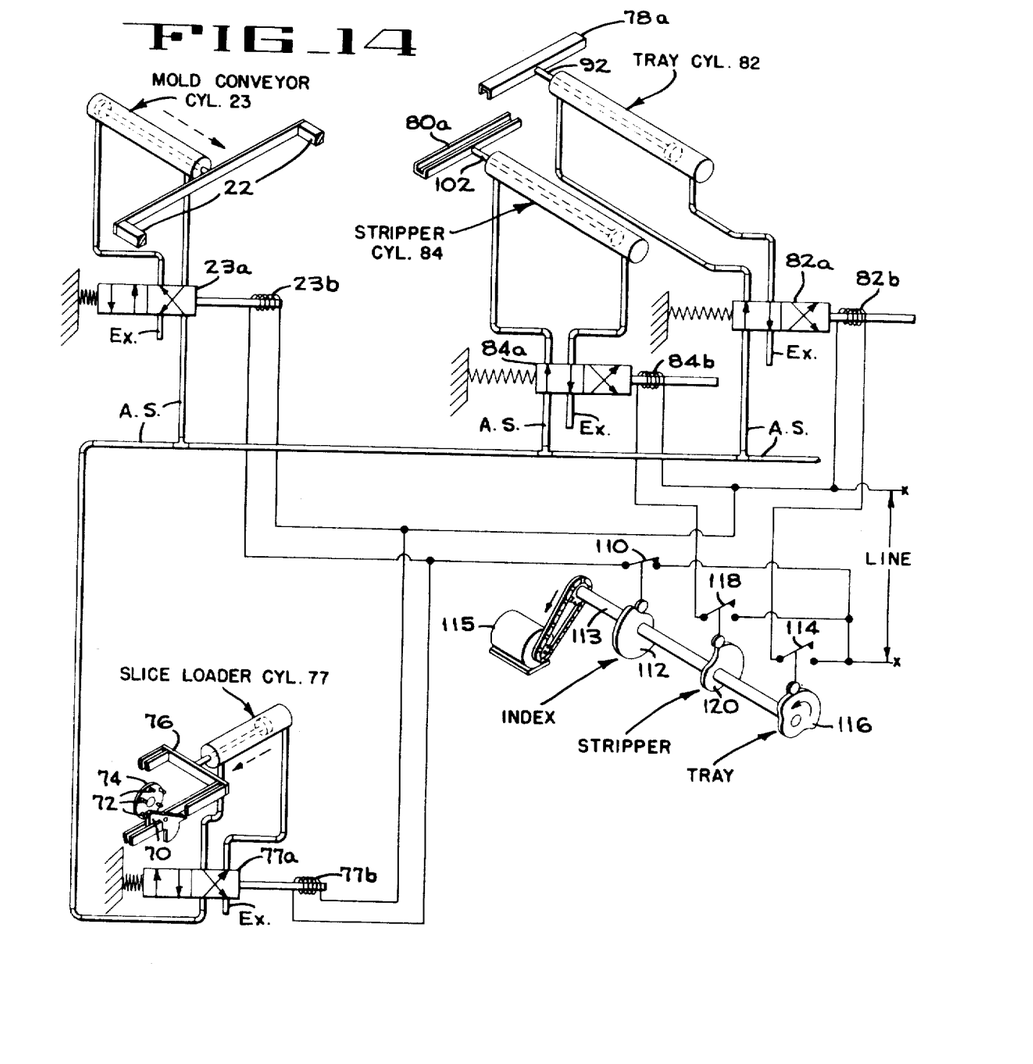
FIG. 14 is a schematic diagram of a control mechanism for the machine.

Although the details of the control system for the freeze molding machine and slice loader are not critical to the present invention, a schematic diagram of a control system suitable for practicing of the invention is shown in FIG. 14 in its simplified form. Air supply lines A.S. and exhaust lines Ex. are connected to the tray cylinder 82, the stripper cylinder 84, the mold conveyor cylinder 23 and the slice loader cylinder 77 by means of solenoid operated four-way valves 82a, 84a, 23a and 77a, respectively. The mold conveyor cylinder 23 and the slice loader cylinder 77 index and dwell together and hence the solenoids 23b and 77b for their control valves 23a and 772 are connected in parallel across the electric power line. However, a switch 110 is in one side of the power line which switch is opened and closed by an index cam 112. This cam is mounted on a cam shaft 113 driven by a control motor 115. The index cam 112 is contoured to cause a short index cycle and a long dwell cycle as previously described and as shown in the timing diagram of FIG. 13. In the control condition of FIG. 14, the index switch 110 has just closed and the valves 23a, 77a have been shifted by their solenoids 23b, 77b to initiate advance of the index cylinders 23, 77.

The solenoid 82b for the tray cylinder solenoid valve 82a is connected across the line in series with a control switch 114. This switch is operated by a tray control cam 116 that is also mounted on the control shaft 114. The cam 116 for the tray switch is contoured to provide a relatively long dwell period during which the switch 114 is open to retract the trays and hold them there, and a shorter, tray advance period during which the switch 114 is closed for advancing track sections 78a and associated trays. FIG. 14 shows the tray switch 114 open and the tray cylinder 82 retracted.

The solenoid 84b for the stripper cylinder control valve 84a is connected across the line and in series with a control switch 118, operated by a stripper control cam 120. The cam 120 is contoured to provide a dwell period with the switch 118 open and the stripper cylinder 84 retracted and held there, as well as another dwell period when the switch 118 is closed and the cylinder is advanced, for holding the slice material in the molds as the loading trays are retracted. In FIG. 14, the stripper switch 118 is open and the stripper cylinder 84 is retracted.

The timing diagram of FIG. 13 relates the various control switch positions with the dwell, advance and retract operations of the conveyors and trays. Comparison of this figure with the control circuit of FIG. 14 will render apparent a complete cycle of operation so that a detailed step by step recitation of such a cycle is un-necessary.

Having completed a detailed description of a preferred embodiment of the invention, it can be seen that slice material can be loaded into the molds of a freeze molding machine of the type described in a manner that facilitates rapid and uniform freezing of the product after the molds have been erected and filled with a liquid, such as gravy.

Although the best mode contemplated for carrying out the present invention has been herein shown and described, it will be apparent that modification and variation may be made without departing from what is regarded to be the subject matter of the invention.

What is claimed is:

1. The method of freezing relatively this slabs of an aggregate of slice material and a liquid, comprising the steps of orienting the slice material in a generally horizontal plane; inserting the material thus oriented into the mouth of a thin, generally horizontal, open-ended mold with the slices generally parallel to the mold sidewalls; tilting the mold into an upright position, with the mold sidewalls maintaining the aforesaid parallel orientation of the material; introducing the liquid into the mouth of the mold, and subjecting the mold thus filled to a freezing medium while maintaining the aforesaid parallel orientation of the material slices for facilitating abstraction of heat from the slice material during freezing.

* * * * *